United States Patent
Fujita et al.

[11] Patent Number: 5,871,676
[45] Date of Patent: Feb. 16, 1999

[54] METHOD FOR SETTING A PROGRAM PROFILE IN THE CONTROL OF THE INJECTION SPEED OF INJECTION MOLDING MACHINE

[75] Inventors: Shigeru Fujita; Susumu Harada, both of Shizuoka, Japan

[73] Assignee: Toshiba Machine, Co., Ltd., Tokyo, Japan

[21] Appl. No.: 622,455

[22] Filed: Mar. 22, 1996

[30] Foreign Application Priority Data

Mar. 24, 1995 [JP] Japan ................................. 7-065968

[51] Int. Cl.⁶ .................................................. B29C 45/77
[52] U.S. Cl. ................ 264/40.1; 264/328.1; 364/475.05; 364/578; 425/145
[58] Field of Search ................................. 264/40.1, 40.5, 264/40.7, 328.1; 425/145; 364/475.05, 475.08, 475.09, 578

[56] References Cited

U.S. PATENT DOCUMENTS

| | | |
|---|---|---|
| 4,135,873 | 1/1979 | Sone et al. |
| 5,008,052 | 4/1991 | Harada . |
| 5,031,127 | 7/1991 | Fujita et al. ............................ 425/145 |
| 5,296,179 | 3/1994 | Kamiguchi et al. ................... 264/40.1 |

FOREIGN PATENT DOCUMENTS

4-69857  11/1992  Japan .

*Primary Examiner*—Jill L. Heitbrink
*Attorney, Agent, or Firm*—Fish & Richardson, P.C.

[57] ABSTRACT

A method for setting up a program profile in the control of the injection speed of injection molding machines where a model shape of an article to be molded is divided into fine elements; the filling up state of melt resin for each fine element is obtained as a time period by using numerical analyzing methods including the finite element method, the boundary element method, the calculus of finite differences method and the FAN method under a condition that the moving speed of the injection plunger is constant; a time period required for filling the model shape of the article as a whole with melt resin is divided into a plurality of material filling up time periods by an arbitrary number; a mean discharge speed $Cv_1$ to $Cv_n$ of melt material at every divided period is calculated; and a moving speed of the injection plunger $Pv_1$ to $Pv_n$ at every divided period is set up as a function of the mean discharge speed $Cv_2$ to $Cv_n$.

7 Claims, 6 Drawing Sheets

METHOD FOR SETTING A PROGRAM PROFILE IN THE CONTROL OF THE INJECTION SPEED OF INJECTION MOLDING MACHINE

BACKGROUND OF THE INVENTION

1. Field of the Invention

The present invention relates to a method for setting a program profile in the control of the injection speed of injection molding machines.

2. Related Art Statement

In injection molding machines, the control of the moving speed of the injecting plunger (screw) in a forward direction is usually conducted in accordance with a program profile, which is preliminarily set up in a computer.

Conventionally the profile is generally set up in the computer in such a manner that a resin material filling stroke of the injection plunger is divided into a plurality of phases, and the moving speed of the plunger in a forward direction is directly designated at every phase to obtain in a multi-step rectangular-shaped profile.

Figure 1:
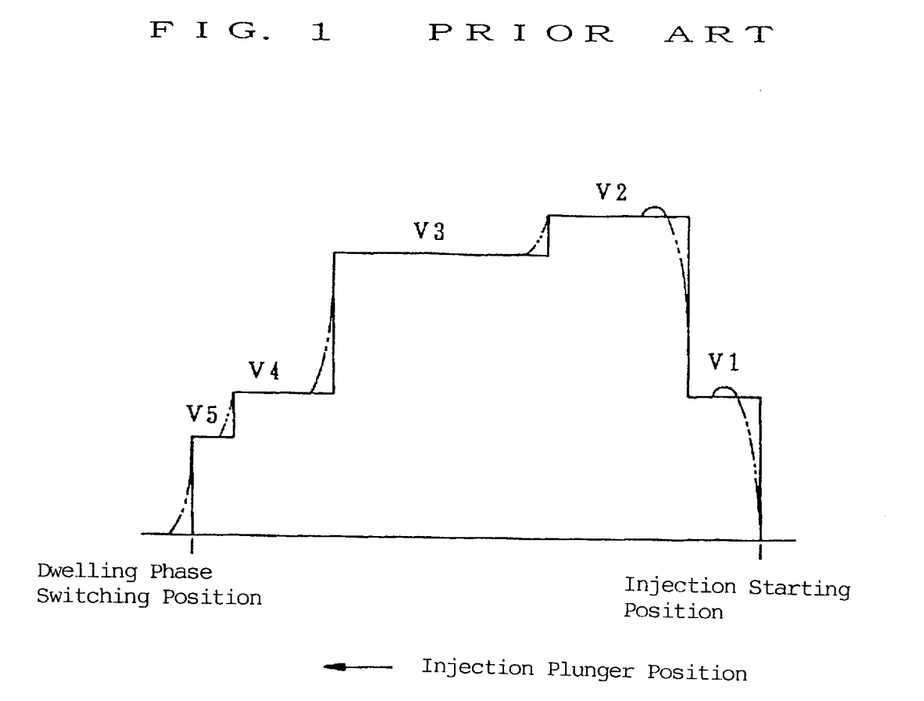
FIG. 1 is a graph illustrating an example of a general program profile in the control of an injection speed of injector molding machines in according to the conventional method.

FIG. 1 is a graph showing a conventional program profile in the control of the moving speed of an injection plunger. As shown in FIG. 1, the filling stroke of the injection plunger is divided into five phases, and the moving speed of the plunger V1 to V5 is directly designated at every phase to obtain the multi-step rectangular-shaped profile.

As shown in FIG. 1, the multi-step rectangular shaped profile would result in sudden changes in the moving speed of the injection plunger in a forward direction. However, in an actual molding process, the cross-section of the course of the melted resin filling the mold die does not suddenly change. Thus a conventional multi-step rectangular-shaped profile does not conform to an actual movement of the melt resin in the mold die.

To obtain a profile which corresponds to the actual shape of the course of the melted resin in the cavity, it is necessary to increase the number of steps of the rectangular-shaped profile. Accordingly, the number of phases to divide the material filling stroke into should also be increased.

Furthermore, as shown in FIG. 1 by broken lines, the actual moving speed of the injection plunger in a forward direction has some delays on the leading and trailing edges, that is, the moving speed of the injection plunger does not immediately switch from one speed level to the next as required by the program profile. Therefore, as apparent from FIG. 1, the actual moving speed of the injection plunger does not change according to the multi-step rectangular-shaped profile set up in the computer.

In general, the program profile controlling the injection speed is set speed so as to complete the filling up of the melt resin within as short a period as possible without disturbing the flowing condition of the melted resin in the cavity. Therefore, the program profile should be set up whereby the moving speed of the plunger is changed so as to comply with the actual shape of the course of the melted resin in the cavity. Furthermore, in order to set up such a profile, a basic knowledge of molding principle is necessary to control the moving speed of plunger when the melted resin starts to be injected from the gate or when the mold die has been filled up with resin.

Therefore, the actual profile of the moving speed of the injection plunger (hereinafter referred to as "a prosecuting profile") does not correctly correspond to the program profile in the control of the injection speed (hereinafter referred to as "a set-up profile"), so that the prosecuting profile and the set-up profile are not the same when superimposed on each other when a closed loop control is conducted. In order to solve this drawback, a delay control is applied, in which time constants are generated on the leading and trailing edges of the moving speed of the plunger. However, such delayed leading and trailing edges are not reflected in the set-up profile.

For these reasons, when a closed loop control is conducted, the prosecution profile deviates from the set-up profile even if the control is conditioned normally; such a deviation causes difficulty in the control of the moving speed of the plunger.

On the other hand, another method for setting a program profile is suggested where the profile corresponds to the variation of the shape of the course of the melt resin in the mold cavity. According to the method, the profile is formed by broken lines being connected together, however, it is difficult to set parameters unless the shape of the course of the melt resin in the mold cavity is well known, and it is required to have many points to be set up in order to obtain the profile which corresponds to the shape of the flowing path of the melted resin. Therefore, according to the method, it would be difficult to realize an idea that the required profile could be obtained with a small amount of inputting data. Further, the know-how for setting the parameters is much more difficult than that for setting a multi-step rectangular-shaped profile.

SUMMARY OF THE INVENTION

It is, therefore, an object of the present invention to provide a method for creating a program profile which will coincide with the actual moving speed profile of an injection plunger in an injection molding machine when the program profile is used to control the injection speed during an injection molding process.

According to the present invention, there is provided a method for creating a program profile for controlling the injection speed of a molten material into a mold die for an injection-molded article using an injection plunger, comprising simulating a molten material filling condition for a model of the injection-molded article over a period of time at a constant injection speed. Dividing the time required to fill up the model with molten material by an arbitrary number n to obtain a plurality of successive filling time intervals $T_i$. Calculating a mean discharge speed $Cv_i$ of the molten material for each time interval $T_i$ from the amount of molten material discharged into the model during each time interval $T_i$.

Setting a moving speed $Pv_i$ of the injection plunger as a function of a mean discharge speed $Cv_i$ for each time interval $T_i$ in accordance with the expression $Pv_i = k/Cv_i$, k being a predetermined function characterizing the desired overall mean discharge speed of the molten material.

DESCRIPTION OF THE PREFERRED EMBODIMENTS

The preferred embodiments of the present invention will be explained below with reference to the attached Drawings.

Figure 2:
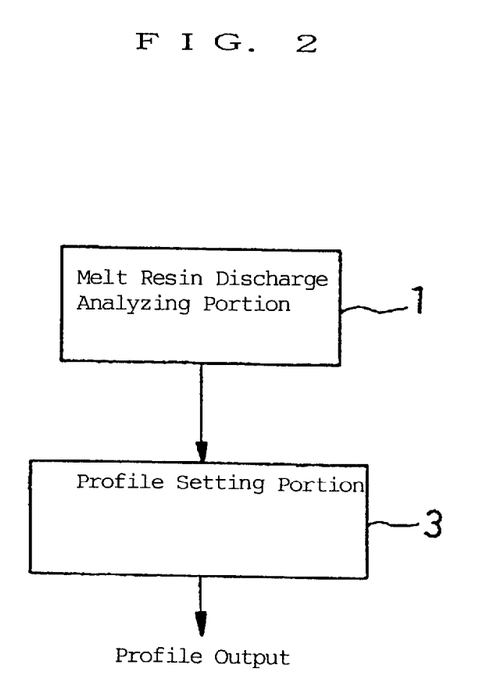
FIG. 2 is a block diagram showing a construction of an embodiment of a program profile setting apparatus to which the method for setting a program profile setting apparatus to which the method for setting a program profile in the control of an injection speed of injection molding machines according to the present invention is applied.

FIG. 2 is a block diagram showing an embodiment of a profile setting apparatus which is used for executing the method for setting a program profile in the control of the injection speed of injection molding machines according to the present invention. The profile setting apparatus comprises a melt resin discharge analyzing portion 1 for analyzing a discharging state of melted resin by using a computer-aided engineering system, and a profile setting portion 3 where the program profile is set up by using a computing system.

In the melt resin, analyzing portion 1, a model shape of an article to be molded including sprues and a runner is divided in preparation for a resin flow analysis. Sprues and runners are feed channels through which melted resin is fed into the cavity of a mold die. Under the condition that the moving speed of an injection plunger in a forward direction is made constant, the filling-up state of melt material (resin) for each fine element of the model shape of the article to be molded is simulated for a time period using numerical analysis methods which include finite element method (FEM), the boundary element method (BEM), the calculus of finite differences method and the FAN method. The results obtained from the simulation are presented in form of isochrones, which are obtained by connecting points on the model where the melt material has filled for a given time period. An example of a resin discharge analysis that may be used in the present invention is presented in Japanese Patent Publication Number Hei 4(1991)-69857.

In the profile setting portion 3, the time T required for filling all the elements of the model shape with melted material is divided into a plurality of periods by an arbitrary number n to obtain the filling-up time periods D1 to Dn. The amount of resin S1 to Sn filled up per unit hour is calculated at every filling up time period D1 to Dn. The amount of resin S1 to Sn can be obtained from the result of multiplying the areas and the thicknesses of all of the fine elements of the model shape which are filled with melted resin during every filling up period D1 to Dn.

Figure 3:
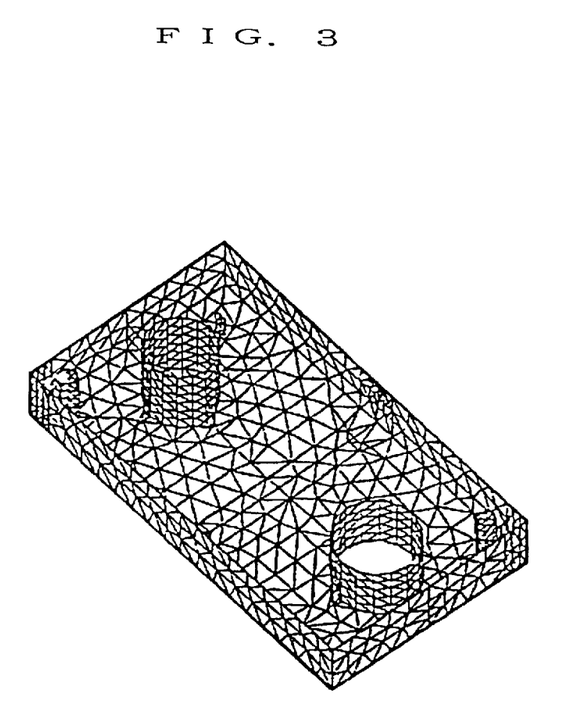
FIG. 3 is a schematic view depicting a casing of a cassette tape as an example of a model shape of an article to be molded, which is divided into fine elements by using the finite element method.
Figure 4:
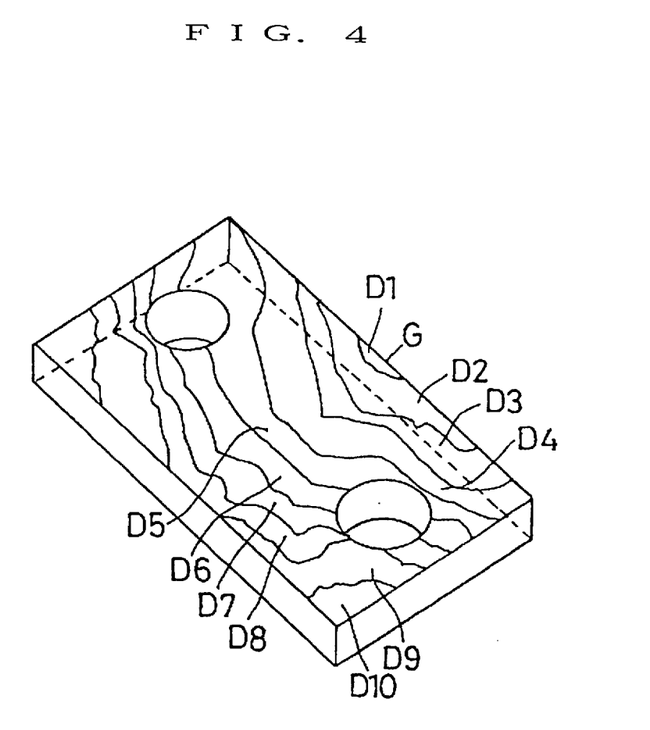
FIG. 4 is a schematic view illustrating a casing for a cassette tape wherein all of the filling time period is divide into 10 filling time periods.

FIG. 3 shows an example where a model shape of the casing of a cassette tape is divided into elements using the finite element method. In FIG. 4, the filling-up time T is divided into ten periods D1 to D10. In this case, the filling-up amount S1 for the first filling up time period D1 can be obtained from the result of multiplying the areas and the thicknesses of the relevant elements which the melt resin has filled up during the periods T0 to T(T/10).

In the profile setting portion 3, the filling-up amounts of resin S1 to Sn, which are obtained by calculating the products of the areas and thicknesses of all of the fine elements, into which the resin is filled up at every filling up time period D1 to Dn, are divided by a time T/n at every filling-up time period to obtain a mean discharging speed Cv1 to Cvn of the melt material in the mold cavity at every filling up time period D1 to Dn. According to the below mentioned formula, the moving speeds Pv1 to Pvn of the injection plunger in a forward direction, which are coincident with a function k, can be obtained.

$$k/(Cv1=Cvn)=(Pv1=Pvn)$$

When the function k is $1/Cvc$, the moving speeds Pv1 to Pvn can be set up so as to make the mean discharge speed constant, i.e. Cvc.

The program profile in the control of the injection speed can be automatically set up by the thus obtained moving speeds Pv1 to Pvn of the injection plunger.

Figure 5A:
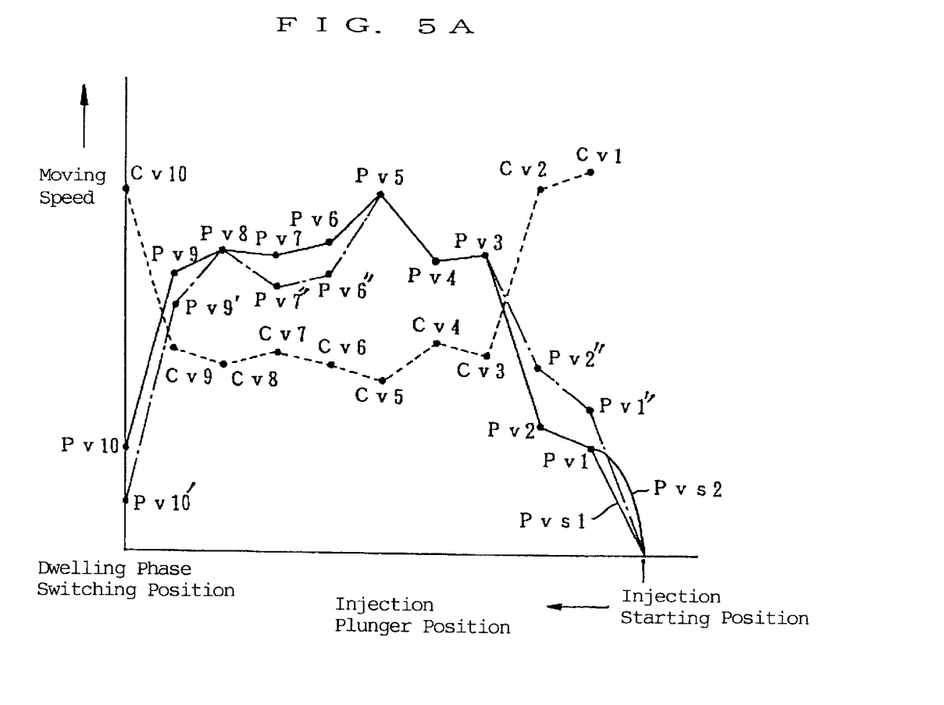
FIG. 5(a) is a graph representing an example of a program profile set up by using the method according to the present invention.

FIG. 5(a) is a graph showing a program profile in the control of an injection speed obtained from the above formula, where the filling-up time as a whole is divided into ten (10) periods. In this graph, the mean discharge speed CV1 to CV10 of the melt material in the cavity is calculated under the condition that the moving speed of the injection plunger in a forward direction is constant. Then the mean discharge speed Cv1 to Cv10 is used to calculate the moving speed the injection plunger Pv1 is such that the mean discharge speed is constant, that is, function k is a constant.

In FIG. 5(a), the reference symbol Pvs1 represents an example where the responding speed of a leading edge of the movement of the injection plunger i.e. how the plunger speed changes when switching from one moving speed level to the next follows a linear function having a predetermined inclination. The reference symbol Pvs2 represents an example where the responding speed of a leading edge of the movement of the injection plunger is set up to follow quadratic function. These setting are to make the responding speed of the leading edge as quick as possible. The function to be used should be selected depending on the discharge property of the resin.

Further, the moving speed of the injection plunger at every filling-up time period can be set up as a decreasing function by which the moving speed decreases from an arbitrarily selected period between the first and last periods to the last period.

In FIG. 5(a), the moving speed of the plunger decreases, as indicated by the reference symbols Pv9' and Pv10' from the 9th period D9 to the last period D10.

This setting is for absorbing any inertia of the filling-up movement of the plunger and for carrying out the switching control of the injecting phase from a melt resin filling-up phase to a dwelling phase in a stable manner.

In the above mentioned embodiment, the influence is not variation in the thickness of the article to be molded is not taken into consideration. However, when the thickness of the article to be molded is varies, it is better to set up the program profile as a function of the mean discharge speed and of the thickness of the article, taking any variation into consideration.

In this case, the moving speed Pv1 to Pvn of the injection plunger at the filling up time periods D1 to Dn is set up as a function k', which is shown below, of mean discharge speeds Cv1 to Cvn and of mean thicknesses t1 to tn of the elements into which melt material is filled up at every filling up time period D1 to Dn.

$$k'●k/(Cv1-Cvn)=(Pv1-Pvn)$$

Figure 5B:
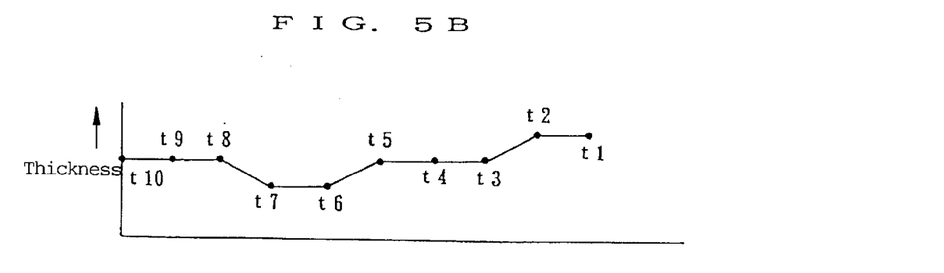
FIG. 5(b) is a graph showing a variation of the thickness of an article to be molded.

For instance, when the mean thicknesses t1 to t10 are varied at every filling-up time period D1 to Dn, as shown in FIG. 5(b), the moving speeds of the plunger Pv1, Pv2, Pv6 and Pv7 are corrected as shown by Pv1", Pv2", Pv6" and Pv7", respectively. The result of the correction in that the variation of the mean thickness is reflected moving speed Pv1 to Pv10, so as to make the moving speed proportional to the variation of the mean thickness of the article to be molded.

According to this setting, since the moving speed of the injection plunger is controlled so as to be in proportion to the mean thickness of the article to be molded at every filling-up time period, the moving speed of the plunger becomes slow at the portion where the mean thickness of the article is thin and fast at the portion where the mean thickness of the article is thick.

Such a program profile is obtained, taking the fact into consideration that the shape of the molded article becomes poor due to overheating, which is caused by a discharge resistance of the melted resin flowing in the cavity. This profile is used depending on the viscosity and heat stability of the material.

For materials where overheating is not a problem, turbulence may be a problem due to high filling speed of the melted material. In this case, the moving speed of the plunger may be set in proportion to a reverse number of the mean thickness of the model shape of the article with a suitable coefficient, so that the mean discharge speed becomes low at the portion where the mean thickness of the article is thin and becomes fast at the portion where the mean thickness of the article is thick.

In case that the moving speeds Pv1 to Pvn of the injection plunger are obtained as functions for the mean discharge speeds Cv1 to Cvn in the mold cavity, it may be possible to arrange such that a front part of the filling-up time periods D1 to D5 is set up as an increasing function and the rear part thereof as a decreasing function.

Figure 6:
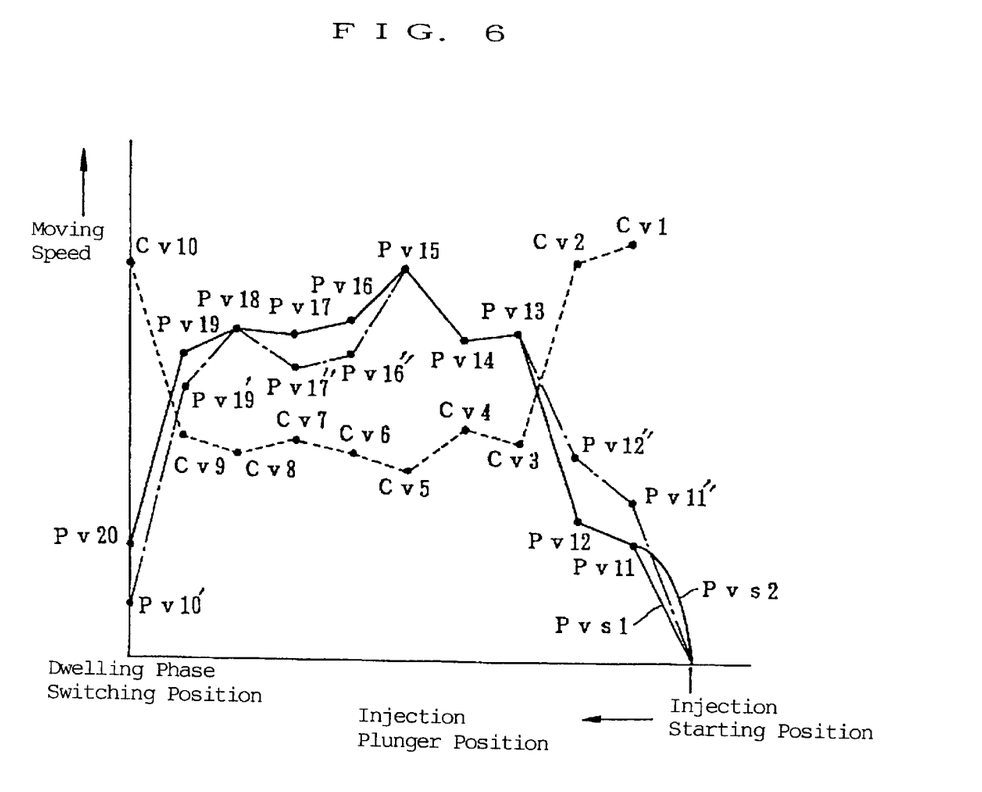
FIG. 6 is a graph depicting another example of a program profile set up by the method according to the present invention.

FIG. 6 is a graph showing such a profile where the front part of periods D1 to D5 is set as an increasing function and the rear part of periods D6 to D10 as a decreasing function. It should be noted that the points Pv11 to Pv20 correspond to Pv1, Pv2 . . . Pv10 of the graph shown in FIG. 5, respectively.

In this case, the moving speed of the plunger may be arranged in the same manner as shown in FIG. 5(a). That is to say, in order to control to switch the injection phase from the material filling-up phase to the dwelling phase in a stable manner, the moving speed Pv19' to Pv20' are reduced. Further, in order to prevent that the shape of the article becomes poor due to overheating, the moving speeds Pv11' to Pv17', Pv19', Pv20' are varied so as to be in proportion to the variation of the thickness of the article.

As stated above, according to the method of the present invention, a filling-up state of melt material is simulated for a time period first for each element of a model shape of an article to be molded under the condition that the moving speed of the injection plunger in a forward direction is constant; the time required for filling-up the model shape of the article to be molded with the melted material, i.e. all of the filling up time, is divided into a plurality of periods by an arbitrary number; a mean discharge speed of the melt material in the cavity is calculated from the amount of resin filled up at every filling-up time period per unit hour; and the moving speed of the injection plunger in a forward direction at every filling-up time period is set up as a function of the mean discharge speed of the melt material. Therefore, the program profile in control of the injection speed can be automatically set up without using any know how so as to make it suitable to the shape of the article to be molded.

Particularly, when a closed loop control is conducted, the profile which is coincident with the actual moving speed of the injection plunger including leading and trailing edges thereof can be set up. Therefore, it is possible to make the difference between the set up values and the prosecuted values minimum.

Further, according to the method of the invention, the mean discharge speed of the melted material is calculated in the same manner as mentioned above, but the moving speed of the injection plunger in a forward direction at every filling-up time period is set up as a function of the mean discharge speed and of the mean thickness of the fine elements into which the melted material is filled up at every filling-up time period. Therefore, the program profile in the control of the injection plunger can be automatically set up without using any know now even if the thickness of the article to be used is varied.

Further, according to the invention, the profile for controlling the moving speed of the plunger in a forward direction is set up at every filling-up time period by using a profile by which the mean discharge speed of the melt material is constant regardless of variations in the area of the cross section of the course of the melted resin in the cavity.

Moreover, according to the method of the present invention, the moving speed of the injection plunger at every filling-up time period is set up so as to be in proportion to the mean thickness of the article to be molded, or the speed is corrected and set up so that the moving speed of the plunger, which is calculated so that the mean discharge speed of the melted material becomes constant without taking the mean thickness of the fine elements into consideration, is in proportion to the mean thickness of the fine elements. In such cases, the profile can prevent the shape of the molded article becoming poor due to overheating of the melt resin.

According to the method of the present invention, the moving speed of the injection plunger at every filling-up time period is set up so as to be in proportion to a reverse number of the mean thickness of the fine elements, or corrected and set up so that the moving speed of the plunger, which is calculated so that the mean discharge speed of the melt material becomes constant without taking the thickness of the fine elements into consideration, is in proportion to the reverse number of the mean thickness of the fine elements. In this case, a profile can be obtained in which attention is paid to prevent turbulence due to a too high filling speed of the material.

Furthermore, according to the present invention, the moving speed of the injection plunger at every filling up time period is set up as a decreasing function in a range from a period abritraryily selected between the first and last periods to the last period. In this case, the switching control from the filling up phase to the dwelling phase can be conducted in a stabilized manner, so that the profile in which a countermeasure for "burrs' is taken can be automatically set up.

According to the present invention, the responding speed of the leading edge of the moving speed of the plunger is set up with the aid of a predetermined function, so that a profile having a sharp leading edge of the moving speed of the plunger can automatically be set up.

What is claimed is:

1. A method for creating a program profile for controlling the injection speed of a molten material into a mold die for an injection-molded article using an injection plunger, comprising, simulating a molten material filling condition for a model of the injection-molded article over a period of time at a constant injection speed;

dividing the time required to fill up the model with molten material by an arbitrary number n to obtain a plurality of successive filling time intervals $T_i$;

calculating a mean discharge speed $Cv_i$ of the molten material for each time interval $T_i$; and setting a moving speed $Pv_i$ of the injection plunger as a function of a mean discharge speed $Cv_i$ for each time interval $T_i$ in accordance with the expression $Pv_i = k/Cv_i$, k being a predetermined function characterizing the desired overall mean discharge speed of the molten material.

2. The method of claim 1, wherein setting a moving speed includes setting k to a constant equal to the inverse of the desired overall mean discharge speed of the molten material.

3. The method of claim 1, wherein setting a moving speed includes setting k such that $k_i$ is proportional to a mean thickness $t_i$ of the portion of the model filled during the time interval $T_i$.

4. The method of claim 1, wherein setting a moving speed includes setting k such that $k_i$ is inversely proportional to a mean thickness $t_i$ of the portion of the model filled during the time interval $T_i$.

5. The method of claim 1, wherein setting a moving speed includes setting k as a decreasing function for time intervals $T_{i=j}$ through $T_{i=n}$, j being an arbitrary number between 1 and n.

6. The method of claim 5, wherein setting a moving speed includes setting k as an increasing function for time intervals $T_{i=1}$ through $T_{i=j}$.

7. The method of claim 1, wherein setting a moving speed includes setting the plunger speed to follow a predetermined function when changing from one moving speed level to the next.

* * * * *